Oct. 7, 1969

R. D. DOBSON 3,471,025

FILTER COMPRISING A BED OF BUOYANT
AND A BED OF NON-BUOYANT SAND

Filed Dec. 13, 1968

INVENTOR
Robert D. Dobson

BY Richard C. Witte

ATTORNEY

United States Patent Office 3,471,025
Patented Oct. 7, 1969

3,471,025
FILTER COMPRISING A BED OF BUOYANT
AND A BED OF NON-BUOYANT SAND
Robert D. Dobson, Greenhills, Ohio, assignor to The
Procter & Gamble Company, Cincinnati, Ohio, a corporation of Ohio
Filed Dec. 13, 1968, Ser. No. 783,637
Int. Cl. B01d 27/02
U.S. Cl. 210—282                              6 Claims

ABSTRACT OF THE DISCLOSURE

A filter for liquids comprising two beds, the lower bed having size-graded normal sand particles, the upper bed having size-graded synthetic sand particles made of a material having a density less than the density of the liquid being filtered.

BACKGROUND OF THE INVENTION

In the art of filtering liquids, a conventional filtering material is sand. The conventional sand filter is known as a "rapid sand" filter. In the rapid sand filter the sand is arranged in layers of different sized particles. The topmost layer is composed of the finest grains of sand whereby the primary filtration is effected. These fine grains are physically supported by slightly larger sand grains. Each succeeding lower layer is composed of progressively larger sand partciles. The graduation is essentially continuous and is accomplished hydraulically when the flow of liquid through the filter is reversed to clean the filter material, i.e., backwashing. During backwashing the drag effect of the reversed flow carries the finer sand to the top. The larger particles tend to remain at the bottom of the filter as the smaller particles are carried upward by the drag effect of the water. The finest sand particles form the upper surface of the filter. There are thousands of very small openings in each square foot of this upper surface. However, these small holes become quickly clogged by matter contained in the liquid being filtered.

With regard to the efficiency of the rapid sand filter, such clogging is desired. This is because the actual filtering material is a gelatinous mat of coagulated matter accumulated on the surface and in the upper part of the sand. Until this mat is formed, the filtrate retains appreciable amounts of contaminants.

However, this coagulated mat has an undesirable effect on the volume of water treated by the filter in a certain period of time, i.e., on the volumetric throughput.

There have been attempts to improve both the efficiency and volumetric throughput of the conventional rapid sand filter. These improvements are aimed at overcoming the two primary disadvantages of such a filter: (1) the low efficiency before the gelatinous mat forms and (2) the effect of too thick a gelatinous mass on the volumetric throughput of the filter.

Past attempts involved some manner of rearranging the orientation of the sand particles in the filter. By placing the finer sand on the bottom and the larger sand on the top, much of the filter clogging experienced with the rapid sand filter can be prevented. This type of arrangement has a top bed composed of larger sand particles which provide a non-clogging absorbent surface. These larger particles trap the large impurities in the filtrate at or near the top of the filter, thereby retarding the clogging of the fine sand matrix at the bottom. The fine sand then has more capacity for trapping the finer impurities out of the filtrate. The problem with such an arrangement has been that of maintaining the orientation of fine sand at the bottom and coarse sand at the top during backwashing. Upon backwashing the larger sand particles tend to settle to the bottom so that the resulting orientation is almost equivalent to the orientation of an ordinary rapid sand filter. Until this invention there was no inexpensive, simple way to maintain such a mirror image orientation, i.e., the finest sand particles at the bottom and large sand particles on top—the reverse orientation of the ordinary rapid sand filter.

It is an object of the present invention to provide a filter for liquids which possesses the advantages of filters whose beds are arranged in the rapid sand filter orientation and also of filters whose filter beds are rearranged in a mirror-image relationship to said rapid sand orientation; yet possesses none of the attendant disadvantages of either.

It is another object of the present invention to provide a filter comprising two beds of size-graded sand particles arranged in a mirror-image orientation which may be maintained easily and naturally during backwashing.

It is yet another object of the present invention to provide a filter which achieves greater clarity in the liquid being filtered than does the conventional rapid sand filter with no attendant decrease in volumetric throughput.

SUMMARY OF THE INVENTION

This invention is a filter for liquids comprising two filter beds. The upper bed consists of several superimposed regions of size-graded synthetic sand. The lower bed consists of several superimposed regions of size graded normal sand. The synthetic sand has a density less than the density of the liquid being filtered. The normal sand has a density greater than that of the liquid being filtered. The particle orientation of the synthetic sand bed is such that the larger, more buoyant particles form the upper region thereof and the smaller, less buoyant particles form the lower region thereof. The orientation of the normal sand bed is such that the smaller particles form the upper region thereof. Thus, the orientation of the particles of synthetic sand bed is in mirror-image relationship to the orientation of the particles of the normal sand bed. (The term mirror-image is not intended to mean a precise identical relationship, but is intended to be a relative, generally-descriptive term.) Such an arrangement results in a greater filter efficiency for the filter and higher volumetric throughput of the filtrate than conventional filters. Also the very fine particles comprising the bottom region of the synthetic sand bed and upper region of the normal sand bed can be of a smaller size than ever before practicable in a filter operation. Such an improvement greatly increases the filter's efficiency and is made possible by the fact that fine sand can be retained in the filter by the bordering regions of larger size particles rather than by fine mesh retainer plates whose effectiveness is physically limited. The only retainer plates are the open plates which need merely to hold the coarse particles in place.

BRIEF DESCRIPTION OF THE DRAWING

While the specification concludes with claims particularly pointing out and distinctly claiming the subject matter which is regarded as forming the present invention, it is believed that the invention will be better understood from the following description taken in connection with the accompanying drawing in which:

DESCRIPTION OF THE PREFERRED EMBODIMENT

The invention will be described herein with relation to filtering water, the preferred filtrate, or like liquid having approximately the same density. However, the improved filter can be used on any liquid with similarly effective results, so long as the requirement concerning the respective densities of the filter bed materials is observed. The particles comprising the upper synthetic sand bed must have a density less than the density of the liquid being filtered (water). The particles comprising the lower normal sand bed must have a density greater than the density of the liquid being filtered.

Figure 1:
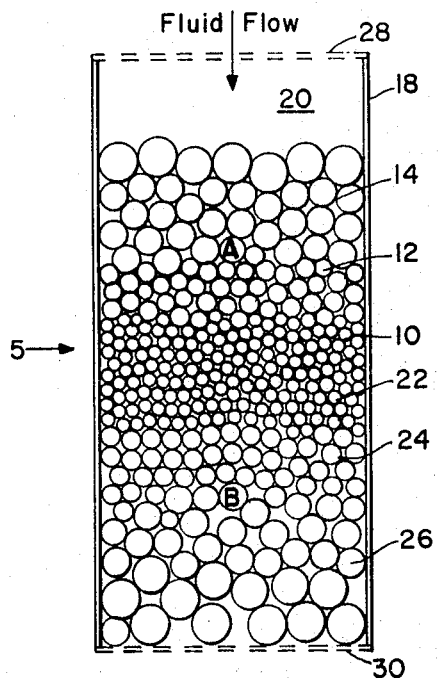
FIGURE 1 is a cross-sectional side view of the filter in operation with a fluid flow.

Referring to FIGURE 1 of the drawings, in vertical cross section a filter for liquids is shown, generally, indicated by reference numeral 5, employing the present invention. The filter comprises an outer filter container 18, upper and lower retainer plates 28 and 30 traversing the inlet and outlet ports of the filter, size-graded filter medium particles held within the boundaries formed by said shell 18 and retainer plates 28, 30. Regions 14, 12, 10, 22, 24 and 26 are held, in descending order, against lower retainer plate 30 by the liquid 20 being downwardly filtered. In the illustrated embodiment the filter comprises two distinct beds of size-graded particles, the buoyant bed A (regions 10, 12 and 14) and the non-buoyant bed B (regions 22, 24 and 26). Each bed contains three regions of different size sand particles (in this case fine, medium and coarse), each region composed of particles of a particular size range. If more, or fewer, regions of either the buoyant or non-buoyant particles are required for the desider operation, the number of regions of either bed will be correspondingly increased or decreased.

The outer shell 20 of the filter, while illustrated as being cylindrical, can be designed to any shape or configuration desired so long as the required orientation of the sand particles can be maintained therein. The shell 20 can be constructed of any material which satisfies the structural, physical, and economic requirements of the operation.

Figure 3:
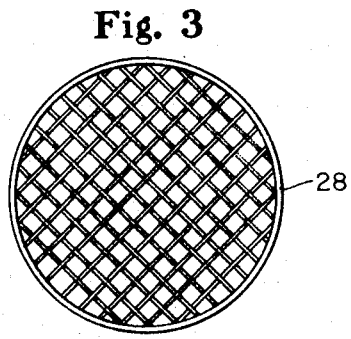
FIGURE 3 is a horizontal cross-section of FIGURE 1 along line 2—2.

The retainer plates 28, 30 as shown in FIGURE 3 are circular metal frames across which is affixed screen mesh. Retainer plates such as these are conventional and well known to those skilled in the art. While pictured as circular, they can be any configuration so long as they cover the entire inlet and outlet ports of the filter 5. Instead of screen mesh various labyrinthine drainage supports of types well known in the filter industry can be used.

Figure 2:
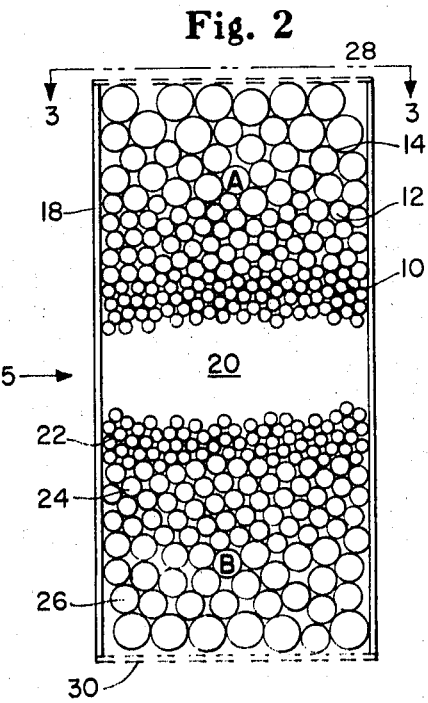
FIGURE 2 is a cross-sectional side view of the filter fiilled with fluid, but when there is no flow through the filter.

FIGURE 2 is the same view of the filter arrangement as shown in FIGURE 1 except there is no flow of liquid 20 through the filter. The liquid 20 is shown in a motionless state with the filter medium suspended therein. In this situation bed A is held against upper retainer plate 28 by the buoyant forces of liquid 20.

The filter as shown in FIGURES 1 and 2 comprises two distinct beds, A and B. The different sized sand particles of bed A have a density less than the density of the liquid 20 being filtered. If water is the liquid, the density (specific gravity) should be less than 1.0, preferably from 0.8 to 0.95. The different sized sand particles of bed B have a density greater than the density of the liquid 20 being filtered. If water is the liquid, the density (specific gravity) should be more than 1.0, preferably from 1.05 to 5. The two beds are clearly distinguished when the liquid 20 is motionless as in FIGURE 2. The buoyant force of the liquid 20 retains bed A at the top of the filter against retainer plate 28. The gravity force on the more dense particles retains bed B at the bottom of the filter against retained plate 30. The particles of either bed can be of any blunt shape, spheroidal, short cylindrical or irregular. Spheroidal is preferred. Particle size dimensions as recited herein represent the smallest linear dimension, e.g., diameter, regardless of shape.

Bed A comprises three regions of buoyant sand particles. Each region is composed of particles of particular size ranges. The top region 14 contains the largest particles. The middle region 12 contains medium sized particles, and the bottom region 10 contains the smallest particles. Preferably, all the granular particles of bed A are made of the same material. The only requirement for such material is that the density thereof is less than the density of the liquid 20 being filtered. Since the liquid 20 shown in FIGURES 1 and 2 is water, the particles of bed A are made of a material having a density less than the density of water. In the example below, the particles of bed A are made of polypropylene. Other suitable low density materials are polyethylene, prilled wax, prilled hydrogenated fat, porous glass with surface vitrification, and any other low density synthetic sand.

Figure 4:
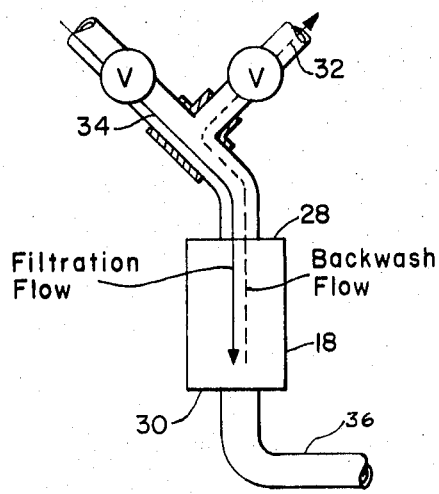
FIGURE 4 is a side view of the entire filter assembly.

The particles of region 10 can be as small as 0.2 mm. With fine particles of this size, the efficiency of the filter is high. Conventional rapid sand filters have a minimum size of fine sand of 0.45 to 0.5 mm. This limitation is due to the fact that such sand particles must be larger than the interstices between the mesh of a retainer screen or, more commonly, where an upper retaining screen is not used, the particles must not be so small as to wash over with the backwash water at rates of backwash flow high enough to effectively wash the filter. The filter of the present invention does not have such a limitation. The finest particles of region 10 are retained in the present filter by the bordering upper regions 12 and 14 of larger particles on the top, and regions 22, 24 and 26 of bed B on the bottom. Thus a size limitation of the upper retainer screen 28 at the backwash flow rate (upward liquid velocity) is of no concern when the flow of filtrate liquid 20 through pipes 34 and 36 is reversed for backwashing. Liquid flow in backwashing changes from the direction of the solid line to the direction of the broken line in FIGURE 4 from pipe 36 through backwash pipe 32 which branches off from main inlet pipe 34. The orientation of bed A is maintained by means of the relative densities and particle drags of regions 10, 12, 14 and the liquid 20 being filtered. The smaller is the size, the greater is the drag, but in all cases the density is less than the fluid being filtered. The net (buoyancy minus drag) upward force upon region 14 and its large constituent particles is greater than the net buoyant force on the regions 10, 12 and their smaller constituent particles. Cessation of filtration flow of liquid 20 prior to backwashing (shown in FIGURE 4), tends to allow the most buoyant particles, which form region 14, to float to the top, the next most buoyant particles, which form region 12, to the mid-section and the least buoyant particles, which form region 10, to the bottom thereby maintaining the reverse orientation of the normal sand filter. This orientation then is stable during subsequent backwashing.

The side graded particles in bed A can range in size from 0.2 mm. to the smallest dimension of openings in the upper filter retainer plate 28. The preferred size for the finest particles comprising region 10 is between 0.2 to 0.8 mm. The intermediate particles comprising region 12 can range in size from 0.8 mm. to 2 mm. The largest particles comprising region 14 preferably range in size from 2 mm. to something equivalent to large gravel or stones, 10 to 25 mm. or more.

The gradation of the different sized particles of all three regions is essentially continuous. Such a gradation can be achieved by inserting the particles comprising regions 10 and 12 into the filter body and then adding the largest particles of region 14. Regions 10 and 12 may become intermixed while being placed in the filter. Any such intermixing is changed to continuous gradation by the relative buoyant forces of the water on the different sized sand particles once the filter is in operation. By means of these buoyant forces, desired gradation of regions 10, 12 and 14 is readily achieved.

Bed B comprises three regions (layers) of non-buoyant, normal filter sand. Each region is composed of particles of specified size ranges. The top region 22 contains the finest particles. The middle region 24 contains medium size sand particles and the botom region 26 contains the largest sand particles. The normal sand particles have a density greater than that of the liquid 20 being filtered (water). Regions 22, 24 and 26 form a conventional sand filter arrangement. One advantage of the rapid sand filter arrangement of this invention is that the sand particles of region 22 can be much finer (as fine as 0.2 mm.) than the finest particles used in any prior conventional rapid sand filter. Conventional rapid sand filters are limited as to the particle size that can be practicably used in their topmost region. This limitation is a size not finer than 0.45 mm. and is due to the drag effect on very fine sand particles, i.e., upon backwashing, the drag force of the liquid would wash the finest sand particles, wherein the primary filtration occurs, out the drain line. The size of the finest sand particles of region 22 in the present invention is not limited by any such restrictions. The reason for this is that region 22 is retained in the system by the particles of regions 10, 12 and 14 on the top and regions 24 and 26 on the bottom. Since it is thus possible to use sand particles in region 22 that are much finer than ever before practicable in a conventional sand filter, the efficiency and effectiveness of the filter of this invention is much greater. The size-graded particles in bed B range in size from 0.2 mm. to 10 mm. to 25 mm. or more. The preferred size for the finest particles comprising region 22 is between 0.2 mm. to 0.8 mm. The intermediate particles comprising region 24 can range in size from 0.8 mm. to 2 mm. The largest particles comprising region 26 can range in size from 2 mm. to any size gravel or stone.

The gradation of the different sized normal sand particles of all three regions in bed B is essentially continuous. Such a gradation can be achieved by inserting the different sized sand particles, one region at a time. Or the sand conglomeration can be placed in the filter bed and orientation achieved by the flow of the liquid 20 during filtration. The gradation is more easily achieved if the particles comprising region 26 are separated from the conglomeration and placed at the bottom of the filter bed initially. The reason for this is that the drag forces of liquid 20 are more successful in establishing a continuous gradation among conglomerated particles which comprise regions 22, 24 than among conglomerated particles which comprise regions 22, 24, 26.

When the filtrate liquid 20 is reversed for backwashing (see FIGURE 4) the orientation of bed B, once established, is undisturbed because of the relative drag effects for the different size sand particles. The drag force of liquid 20 tends to pull the smallest particles, layer 22, to the top, the next largest particles, layer 24, to the midsection, leaving the densest particles, layer 26, at the bottom thereby maintaining the orientation of the conventional rapid sand filter.

In both beds A and B the finer particles of regions 10 and 12 and 22 and 24 perform most of the filtration function. While the coarser particles of beds A and B, i.e., regions 26 and 28, are present mainly for support of the respective finer particle regions. Thus, in beds A and B, the finer particles should be sufficient in amount to perform the desired filtration function while the coarser particles should be sufficient in amount to provide adequate support. In bed B, support is in a gravitational sense, while in bed A, support is in a sense relative to the buoyant forces involved. The exact quantities of size-graded particles used are readily determinable by one skilled in the filtration art. Preferably the quantity of support particles in either bed A or B, i.e., the coarser particles of regions 14 and 30, are from 5% to 30% by volume of the respective beds, with the finer filtering particles comprising the balance respectively of each bed.

EXAMPLE

A working filter as described in the specification and drawings was made. The filter column 18 was constructed from a 3¾ inch internal diameter plexiglas cylinder to allow visual observation of the operating beds A and B. The retaining screens 20 and 30 were 8 mesh.

Sand bed B had three regions. The finest, region 22, was of Muscatine sand having a uniformity coefficient of 1.60 and a particle size range of 0.4 to 0.5 mm. (Uniformity coefficient is the ratio between the size in millimeters of the sand particles and the effective size. The effective size is that size of sand below which 10% of the sample was finer and above which 90% of the sand was larger.) The intermediate particles, region 24, was coarse Muscatines and ranging in particle size from 0.8 to 1.2 mm. The supporting base (approximately 20% of the volume of bed B) for regions 22 and 24 of Muscatine sand was a triple layer of 6 mm. glass beads and a layer of ¼ inch gravel. The density of the sand, beads and gravel in bed B was greater than water, ranging approximately from 2 to 2½.

The plastic sand for bed A was manufactured from Enjay Escon 117 polypropylene, Grade CD22B with a specific gravity (density) of 0.915. The polypropylene was heated to about 400° to 450° F. and was extruded under pressures of 600 to 1000 p.s.i.g. into filaments of various diameters. The filaments were then cut up into lengths of approximately 0.064 inch, resulting in a plastic sand with a normal size distribution ranging, through regions 10, 12 and 14, from 4 mesh to 40 mesh (.187 to 0.165 inch or 4.75 to 0.42 mm.). The particles were surface treated with a calcium hydroxide solution and precipitated with sodium phosphate. This calcium phosphate surface treatment eliminated the hydrophobicity of and the tendency of the particles to aggregate when placed in the filter. The particles in region 10 ranged in size from 0.42 mm. to 0.8 mm. The particles in region 12 ranged in size from 0.8 mm. to 2 mm. The particles in region 14, which was approximately 20% by volume of the filter, ranged in size from 2 mm. to 4.75 mm.

The filter feed through pipe 34 consisted of water with 0.1 gram/liter of activated charcoal powere and 0.01% by weight of aluminum sulfate (alum). The purpose of the charcoal was to provide a filter feed that could be easily reproduced, could be checked for clarity in determining filter efficiency, and would have a small enough particle size to necessitate flocculation to effectively remove the contaminant. Alum was the fluocculent, gathering the very fine particles into large clusters which were then easily removed using the filters.

An automatic level control valve provided the feed through pipe 34 as needed to the filter column which was maintained at a constant head of 20 inches of water. Flow rates of 2, 2.5, 3, 3.5, 4, 4.5, and 5 g.p.m./ft.$^2$ were employed. After passing through the filter, the water was directed through pipe 36 to a flow meter.

The double filter trapped an amount of material greater than that trapped by a conventional rapid sand filter. This was especially noticeable during the backwashing operation. In a sequence of filtration runs, no cumulative filter buildup was noted and complete backwashing was effected each run.

Samples of the filtrate were taken at regular time intervals and provided a qualitative filter efficiency comparison with a conventional rapid sand filter under similar conditions. Improvements in filtrate clarity with the filter of this invention as compared to a rapid sand filter ranged from 16% to 32%. The increase in volumetric throughput per filtration and backwash cycle was about 80%.

The filter of this invention can be used to filter effectively all of the usual solids-containing waters which are customarily filtered with rapid sand filters.

While particular embodiments of the invention have been illustrated and described it will be obvious to those skilled in the art that various changes and modifications can be made without departing from the spirit and scope of the invention and it is intended to cover in the ap-

What is claimed is:

1. A filter for liquids comprising an outer filter container consisting of vertical side walls and two horizontal retainer screens affixed thereto within which are contained two beds of filter particles, an upper bed and a lower bed, the upper bed comprising buoyant particles having a density less than the density of the liquid being filtered, the lower bed particles having a density greater than the density of the liquid being filtered, each bed comprising size-graded particles, the finest particles of the upper bed being at the bottom thereof, the finest particles of the lower bed being at the top thereof, the coarsest particles of the upper bed being at the top thereof, the coarsest particles of the lower bed being at the bottom thereof.

2. The filter of claim 1 wherein the densities of the respective particles are related to the density of water.

3. The filter of claim 2 wherein the finest of the size-graded particles of each bed range in size from 0.2 mm. to 0.8 mm.

4. The filter of claim 3 wherein the density of the upper bed particles ranges from 0.8 to 0.95 and the density of the lower bed particles ranges from 1.05 to 5.

5. The filter of claim 4 wherein the upper bed particles comprise polypropylene and the lower bed particles comprise sand.

6. The filter of claim 5 wherein the polypropylene particles have a calcium phosphate precipitate thereon.

References Cited

UNITED STATES PATENTS

| | | | |
|---|---|---|---|
| 2,057,237 | 10/1936 | Hoop | 210—290 X |
| 2,101,961 | 12/1937 | Slidell | 210—275 X |
| 2,605,901 | 8/1952 | Morrison et al. | 210—282 |
| 3,148,962 | 9/1964 | Dellinger et al. | 210—290 |

FOREIGN PATENTS 12,072 of 1895 Great Britain.

SAMIH N. ZAHARNA, Primary Examiner

U.S. Cl. X.R.

210—290